United States Patent [19]  [11] 3,740,528
Wohlfart et al. [45] June 19, 1973

[54] BIMETALLIC TIMING MECHANISM FOR AUTOMATIC BREAD TOASTER

[75] Inventors: Kurt Wohlfart, Offenbach/Main; Henz Marburger, Frankfurt am Main, Germany

[73] Assignee: Rowenta Werke GmbH, Offenbach am Main, Germany

[22] Filed: June 28, 1972

[21] Appl. No.: 267,101

[30] Foreign Application Priority Data
June 28, 1971 Germany.................. P 21 31 977.7

[52] U.S. Cl.................. 219/510, 219/492, 337/102
[51] Int. Cl. .............................................. H05b 1/02
[58] Field of Search .................. 219/491, 492, 510, 219/511, 77; 337/102, 105, 99

[56] References Cited
UNITED STATES PATENTS
3,562,688   2/1971   Kussy et al...................... 337/102 X
2,726,596   12/1955  Leard............................. 219/511 X Primary Examiner—Bernard A. Gilheany
Assistant Examiner—F. E. Bell
Attorney—George R. Clark

[57] ABSTRACT

A timing mechanism for an automatic bread toaster is provided which has a regulating knob and a bimetallic element that is mounted on an adjustable calibrating spindle. When the toaster activated by the depression of the bread slide electrical current heats the bimetallic element, the element is thereby deflected to a point where it engages a groove in a control slide and it also switches off its own heating current. The control slide is moved by the bimetallic element as it cools until it releases a latching pawl from engagement with the bread slide, thereby allowing the bread slide to return to its raised position.

7 Claims, 7 Drawing Figures

Patented June 19, 1973 3,740,528

BIMETALLIC TIMING MECHANISM FOR AUTOMATIC BREAD TOASTER

The invention relates to a bimetallic timing mechanism for an electrically heated toaster for bread or the like with automatic ejection of the toasted article after completion of toasting.

It is commercially required of toasters that are provided with a timing mechanism that each toasted slice of bread be uniformly browned, independently of whether or not the toaster is cold or hot at the start of the toasting operation. Furthermore, it is required of commercial toasters that the adjustment range for the toasting times be large in order that dry white bread (short time) and also moist grey bread (long times) can be toasted satisfactory.

In order to satisfy these requirements, a bimetallic strip (referred to hereafter shortly as the bimetal) controls the timing mechanism, the bimetal conventionally has a heating winding or conductor through which the toasting current flows, thereby heating the bimetal. After a predetermined time, as a result of its flexing due to heating of the bimetal, the bimetal automatically switches off a switch that controls its own heating current. Thereafter, the bimetal cools down again and flexes back in a direction towards its initial position. Flexing continues until the bimetal releases the detent arrangement of the ejecting device and, thereby, directly or indirectly, interrupts the toasting current so that the toasting procedure is terminated.

Bread toasters with bimetallic timing mechanisms of the kind described above are known. According to the present invention, a bimetallic timing mechanism is provided which satisfies the above-mentioned requirements in a simple manner and with few structural parts. The bimetallic timing mechanism of the present invention is for an automatic break toaster, which is provided with a slide which is under the action of a tension spring and which serves as a switching on and switching off device. The timing of the mechanism of the present invention has a bimetallic element that is electrically heated when the toaster is activated and, after a predetermined time, the bimetallic element deflects to activate a switch that short circuits or switches off its own heating current. After the bimetallic element is partially deflected back into its initial position it releases a detent connection with the slide, whereupon the toasting procedure is ended and the bread is ejected.

It is an object of the present invention to provide a bimetallic timing mechanism in which the bimetallic element is mounted on an adjustable threaded spindle and is rotatable transversely to its flexing direction.

It is another object of the present invention to provide a bimetallic timing mechanism for a toaster in which the bimetallic element is mounted on an adjustable threadable spindle, the timing mechanism is housed in a box-like housing on which a regulating knob for timing means is mounted, an opening is provided in the housing so that the spindle of the timing mechanism may be rotated to provide adjustment for the timing mechanism by a tool inserted through the opening and a cam on the regulating knob is engaged by a portion of a control slide of the timing mechanism when the bread slide of the toaster has been depressed.

It is an additional object of the present invention to provide a bimetallic timing mechanism for a toaster in which the bimetallic element is mounted on an adjustable threaded spindle so as to be rotatable transversely to its flexing direction and the pawl which holds the bread slice of the toaster in its switched on position is also mounted on the threaded spindle, the position of the pawl being controlled by the position of a control slide that is controlled in turn by the bimetallic element.

The invention will be further described in detail with reference to the accompanying drawings of a preferred embodiment, and in which.

Figure 1:
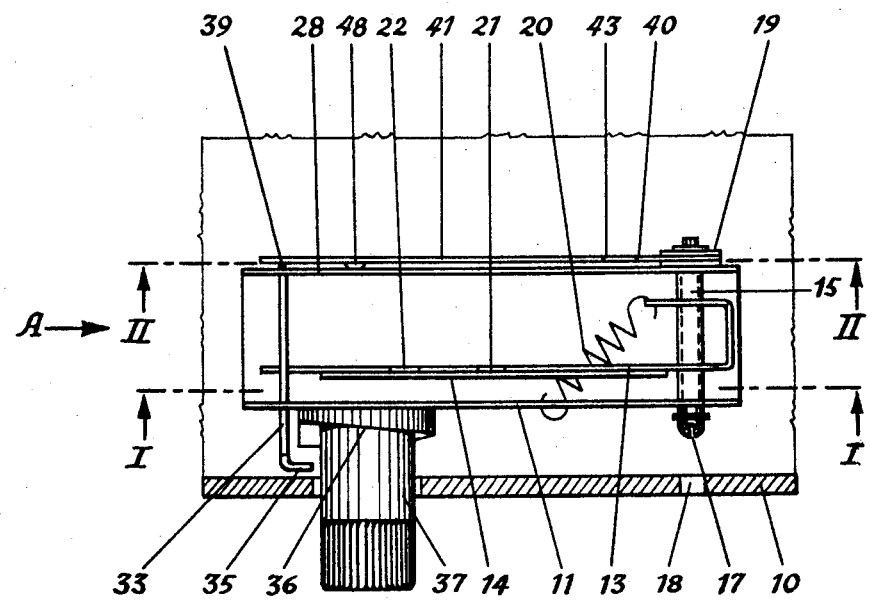
FIG. 1 is a plan view of a bimetal timing mechanism for a toaster according to the invention, in a switched off condition.

A toaster incorporating the mechanism is switched on by pressing down a slide 46 (FIG. 3), which is guided on a guide rod 25. Firstly, a main switch 32 is closed by the downwardly moving slide 46. Then a detent lever 44 which is on a shaft 45 and under the section of a compression spring 26 slides over a nose 43 of a pawl 40. After this, a lug 27 provided on the slide 46 presses on a lower arm 41 of the pawl 40, until the upper edge of the arm 41 lies lower than a lower edge 16 of a control slide 33.

Figure 4:
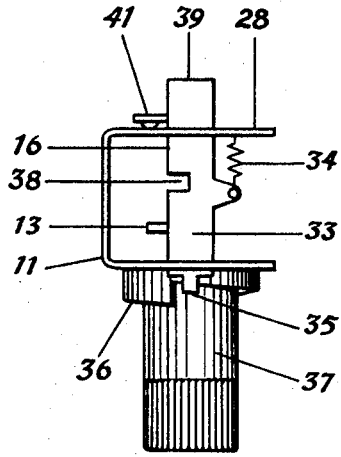
FIG. 4 is a simplified end view directly after switching on, in the direction A of FIG. 1.

Simultaneously or shortly thereafter, an abutment 24, also provided on the slide 46, presses on an extension 22 of a bimetal 13, so that this performs a rotary movement around a threaded spindle 15, until its free end emerges from a carrier groove 38 in the control slide 33. Under the action of a spring 34, the control slide 33 now moves so far rearwardly that its bent over end 35 lies on a helical surface 36 of an adjusting knob 37 (FIG. 4).

The bimetal 13 has a further extension 21 which now opens a previously closed switch 23, so that the entire current also flows through a heating winding 14 of the bimetal 13 and heats this and thus causes it to flex.

After releasing a key (not illustrated) which presses down the slide 46, the slide moves upwardly under the action of a tension spring 47 until the bent over lower end 42 of the detent lever 44 engages the nose 43 of the pawl. The switch 23 remains open however, since the movable end of the bimetal 13 is held fast in its position by the control slide 33.

Figure 2:
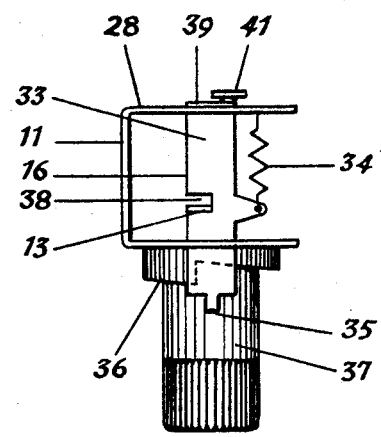
FIG. 2 is a simplified end view of the mechanism in the switched off condition, in the direction A of FIG. 1.
Figure 5:
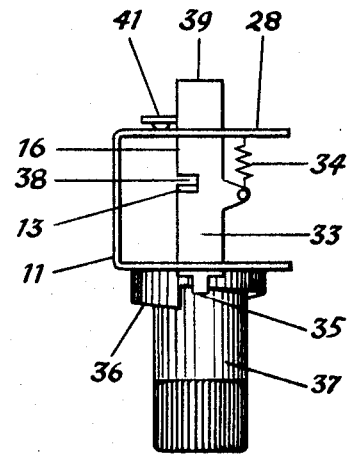
FIG. 5 is a simplified end view directly after switching off of the bimetal heating, in the direction A of FIG. 1.
Figure 6:
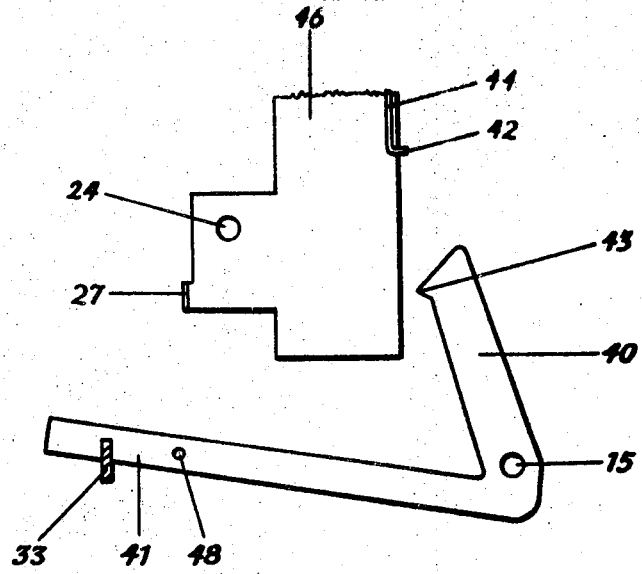
FIG. 6 is a simplified section along the line II—II in FIG. 1, in the switched off condition.
Figure 7:
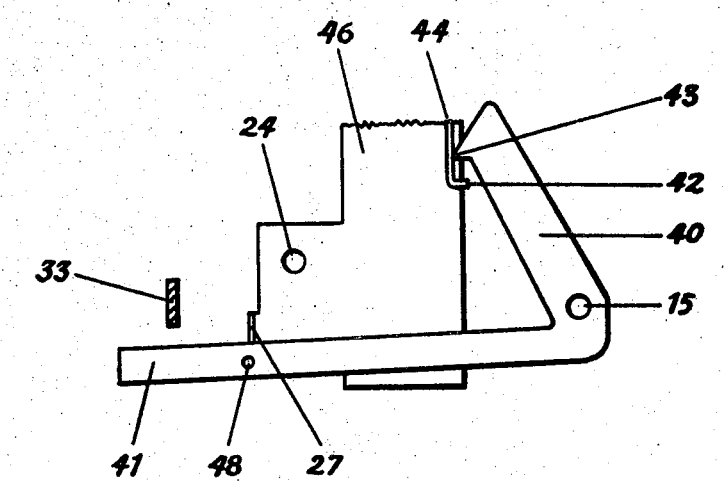
FIG. 7 is a simplified section along the line II—II in FIG. 1, in another condition.

After sufficient flexing of the bimetal 13, its movable end, according to the setting of the adjusting knob 37, passes under the carrier groove 38 of the control slide 33. By the tension force of a spring 20, the bimetal 13 is rotated somewhat around the threaded spindle 15, and drops with its upper end into the carrier groove 38 (FIG. 5). Simultaneously, by the rotation of the bimetal 13, the switch 23 is closed through its projection 21, whereby the heating winding 14 of the bimetal 13 is short circuited and thus it no longer is heated. The bimetal 13 thus cools down again and moves towards its initial position, carrying the control slide 33 with it. On sufficient cooling down of the bimetal 13, that is to say when it has returned far enough to its initial position (FIG. 2), the free end 39 of the control slide 33 releases the lower arm 41 of the pawl 40, so that the detent 44 is released and the slide 46 is moved upwards by the tension spring 47.

Since the bread ejecting device (not shown) and, as mentioned above, also the main switch 32 are actuated by the slide 46, the toasting procedure is now terminated.

The setting of the toasting duration is effected by rotating the setting knob 37. By this, the position of the control slide 33 and thus of its carrier groove 38 are changed, which again results in a larger or smaller forward and return movement path of the bimetal 13 and thus longer and shorter toasting times.

The basic adjustment of the bimetal 13 is effected by the threaded spindle 15, the front end of which for example is provided with a slot 17 or with a threaded knob. By rotating the spindle 15, the fixedly mounted end of the bimetal 13, which is provided with a thread, is displaced and thus the entire bimetal is displaced parallel to itself. In order to obtain a good mounting of the bimetal 13, its mounted end is constructed of U-shape (FIG. 1) or provided with a threaded bush.

The tension spring 20 is provided between the timing mechanism housing 11 and the bimetal 13 in such a manner that a tensional force component acts through the threaded connection of the bimetal 13 to the threaded spindle 15 in such a way that a fixing ring 19 provided at the rear end of the spindle 15 always lies firmly against the timing mechanism housing surface 28, and another tensional force component acts on the bimetal 13 in the direction such that its free end always lies against the lower edge 16 of the control slide 33 or its carrier groove 38. The control slide 33 is mounted so as to be easily displaceable in slots of the side walls of the timing mechanism housing 11.

The threaded spindle 15 is preferably also the rotation shaft for the pawl 40. By this it is achieved that the tension spring 20 also draws the pawl 40, and more particularly its lower arm 41, always against the lower housing surface 28 of the timing mechanism. That is important for the reason that the lower arm 41 cooperating with the control slide 33 always must assume an accurately defined position. The arm 41 advantageously has a protrusion so that it easily slides on the surface 28.

Under certain conditions it may be advantageous to make the lower arm 41 of the pawl 40 adjustable relative to the control slide 33. Then, the arm 41 is provided at the region of the protrusion 48 with a setting screw, or a bendable lug is punched out of the rear housing 28 of the timing mechanism.

The bimetal timing mechanism according to the invention is a unitary structure. All parts serving for the faultless functioning are provided in and on the upwardly open U-shaped housing 11 of the timing mechanism. It can be mounted by itself and standardised before being built into the bread toaster or alternatively afterwards through an opening 18 in a housing wall 10 of the toaster by rotating the threaded spindle 15.

The bimetal timing mechanism is fixed to the base 12 of the bread toaster, advantageously in a releasable manner, through its housing 11 by means of screws, lugs or other suitable means.

Figure 3:
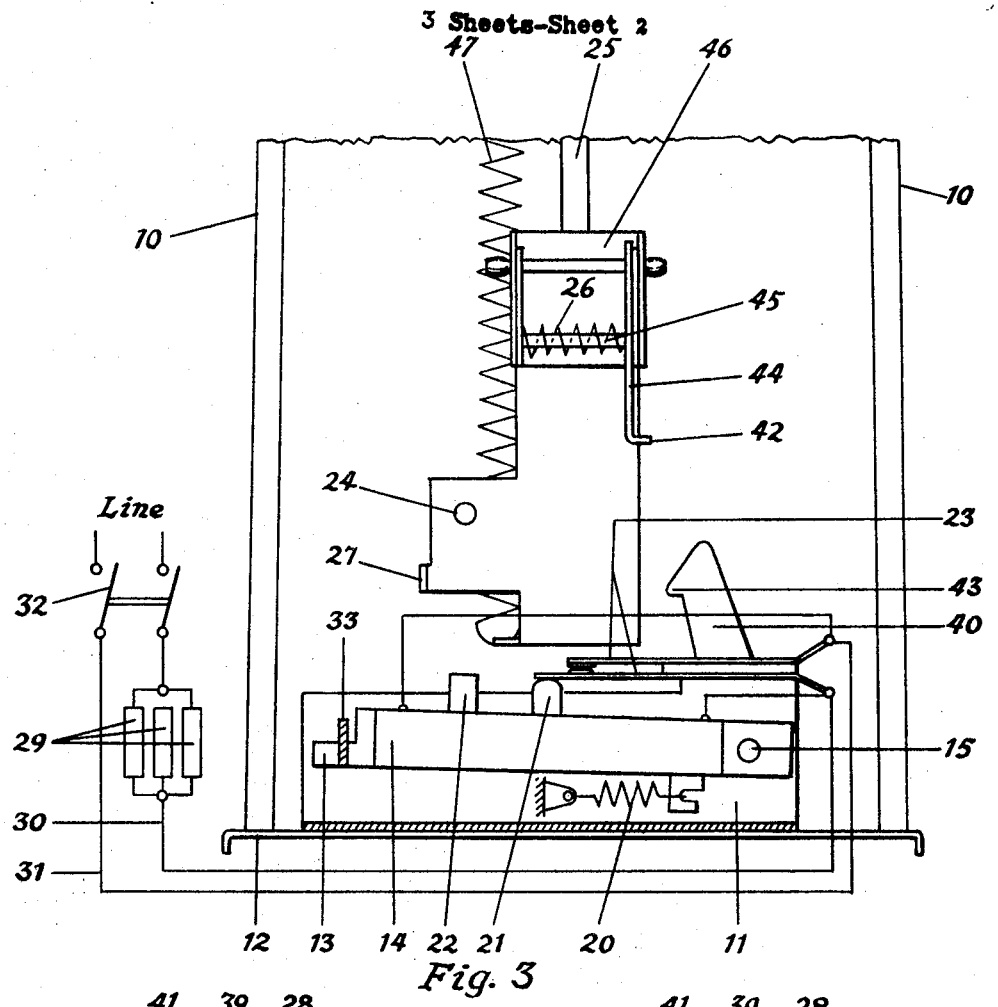
FIG. 3 is a section along the line I—I of FIG. 1 with the toaster circuit diagram drawn in, in a switched off condition.

In FIG. 3, the known circuit of the described bread toaster is also illustrated. Toasting heating elements 29 are connected by lines 30 and 31 to the heating winding 14 of the bimetal 13 and to the switch 23 connected in parallel to the heating winding 14.

With the main switch 32 switched on and the switch 23 off, the entire current flows through the toaster heating elements 29 and the bimetal heating winding 14. With the switch 23 closed, which corresponds to the condition of the device according to FIG. 5 (bimetal 13 with extension 21 upwardly swung) the heating winding 14 is short circuited by the practically resistanceless switch 23. The bimetal 13 cools down to the temperature existing in the interior of the toaster housing 10, and thus returns to its starting point.

Although a particular embodiment of the present invention has been described, it is not intended that the present invention be limited to the particular embodiment illustrated herein since variations and modifications thereof will be apparent within the scope of the present invention to those skilled in the art.

What is claimed as new and desired to be secured by Letters Patent of the United States is:

1. A bimetallic timing means for an automatic bread toaster having a depressable slide means, a first heating means for toasting the bread that is inserted in said toaster and an on-off first switch means which is turned on by the depression of said depressable slide means for activating said first heating means comprising a housing, an adjustable spindle mounted on said housing, a pawl means mounted on said timing means for engaging said depressable slide means when said depressable slide means has been depressed and said first switch means is turned on, a deflectable bimetallic element mounted on said adjustable spindle so as to be rotatable transversely to its flexing direction, second heating means for supplying electrical current for heating said bimetallic element comprising second switch means which upon a predetermined deflection of said bimetallic element in response to the heating of said bimetallic element is switched to deactivate said second heating means and control slide means slideable in the flexing direction of said bimetallic element which cooperates with said bimetallic element so as to release said engagement of said pawl means and said depressable slide means upon completion of said toasting cycle thereby turning said first switch means off and deactivating said first heating means.

2. A bimetallic timing means in accordance with claim 1 wherein said bimetallic element comprises an extension which activates and deactivates said second switch means in accordance with the position of said bimetallic element.

3. A bimetallic timing means in accordance with claim 2 wherein said pawl means is rotatably mounted on said adjustable spindle and the depression of said depressable slide means positions a portion of said pawl means in a latched position with respect to said control slide means until the toasting cycle has been completed.

4. A bimetallic timing means in accordance with claim 1 wherein said pawl means is rotatably mounted on said adjustable spindle and the depression of said depressable slide means positions a portion of said pawl means in a latched position with respect to said control slide means until the toasting cycle has been completed.

5. A bimetallic timing means in accordance with claim 4 comprising first resilient means for biasing said bimetallic element into contact with a surface of said control slide means, said surface having a groove therein which receives a portion of said bimetallic element when said second heating means is deactivated, the cooling of said bimetallic element acting to move said control slide means so as to release said pawl from said latched position after a predetermined time.

6. A bimetallic timing means in accordance with claim 5 wherein the relative position of said bimetallic element with respect to such control slide means and said groove may be adjusted by rotation of a regulating knob which has a camming surface that receives a control projection on said control slide means and said timing means comprises second biasing means for biasing said control projection toward said camming surface.

7. A bimetallic timing means in accordance with claim 6 wherein said bimetallic element comprises an extension which activates and deactivates said second switch means in accordance with the position of said bimetallic element.

* * * * *